United States Patent
Nammi et al.

(10) Patent No.: US 9,882,617 B2
(45) Date of Patent: Jan. 30, 2018

(54) METHOD AND APPARATUS FOR REPORTING PRECODING INFORMATION IN A COMMUNICATION NETWORK

(71) Applicant: Telefonaktiebolaget L M Ericsson (publ), Stockholm (SE)

(72) Inventors: Sairamesh Nammi, Kista (SE); Thomas Chapman, Solna (SE); Bo Göransson, Sollentuna (SE); Muhammad Kazmi, Bromma (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 104 days.

(21) Appl. No.: 14/901,282

(22) PCT Filed: Nov. 16, 2015

(86) PCT No.: PCT/SE2015/051224
§ 371 (c)(1),
(2) Date: Dec. 28, 2015

(87) PCT Pub. No.: WO2017/086843
PCT Pub. Date: May 26, 2017

(65) Prior Publication Data
US 2017/0201299 A1    Jul. 13, 2017

(51) Int. Cl.
*H04B 7/02* (2017.01)
*H04B 7/0456* (2017.01)
(Continued)

(52) U.S. Cl.
CPC .......... *H04B 7/0456* (2013.01); *H01Q 21/00* (2013.01); *H04L 67/22* (2013.01); *H04W 4/025* (2013.01)

(58) Field of Classification Search
CPC ................................................. H04B 7/0456
(Continued)

(56) References Cited

U.S. PATENT DOCUMENTS

2013/0308714 A1* 11/2013 Xu ................. H04B 7/0417
375/267
2015/0195071 A1* 7/2015 Lunttila ............... H04L 5/0053
370/329
2015/0318909 A1  11/2015 Zhang et al.

FOREIGN PATENT DOCUMENTS

WO   2015016489 A1   2/2015

OTHER PUBLICATIONS

Unknown Author, "Discussions of CSI Reporting for FD-MIMO", +3GPP TSG RAN WG1 Meeting #82, R1-154365, Beijing, China, Aug. 24-28 2015, Source: ITRI, Aug. 24-28, 2015, 1-4.

* cited by examiner

*Primary Examiner* — Lihong Yu
(74) *Attorney, Agent, or Firm* — Murphy, Bilak & Homiller, PLLC (57) ABSTRACT

In one aspect of this disclosure, a communication device sends first and second precoding reports to a network node by time multiplexing the first and second precoding reports onto a reporting channel in accordance with a multiplexing ratio. The first and second precoding reports comprise first and second precoding recommendations, respectively, and correspond to the first and second dimensions of an antenna array used for transmitting to the communication device. Among other advantages, multiplexing of the first and second reports enables the communication device to reuse a reporting channel and at least some of the underlying reporting protocols or signaling arrangements to report multi-dimensional precoding information. The corresponding network node uses its knowledge of the multiplexing ratio to differentiate between the first and second reports. Moreover, the involved multiplexing ratio may be adapted, either by the network or the communication device, in view of changing operating scenarios.

38 Claims, 5 Drawing Sheets

(51) Int. Cl.
*H01Q 21/00* (2006.01)
*H04L 29/08* (2006.01)
*H04W 4/02* (2009.01)

(58) Field of Classification Search
USPC .......................................................... 375/267
See application file for complete search history.

METHOD AND APPARATUS FOR REPORTING PRECODING INFORMATION IN A COMMUNICATION NETWORK

TECHNICAL FIELD

The invention relates to communication networks and particularly relates to reporting preceding information from a receiving node to a transmitting node.

BACKGROUND

Ongoing technology and standardization developments make the use of large antenna arrays at cellular base stations and other wireless access points a viable option to boost the air interface capacities and maximum data rates of wireless communication networks. Consider a base station or an access point equipped with a large number of antennas. The node can simultaneously schedule multiple wireless devices in the same time/frequency band, using simple linear processing such as maximum-ratio transmission or zero-forcing in the downlink and maximum-ratio combining or zero-forcing in the uplink. Current literature often refers to these multi-antenna arrangements as multiple-input-multiple-output, or MIMO.

MIMO can therefore be understood as an advanced antenna technique that improves spectral efficiency and boosts overall system capacity. MIMO can be used for achieving diversity gain, spatial multiplexing gain and beamforming gain. The MIMO technique uses a commonly known notation (M×N) to represent a MIMO configuration in terms of the number of transmit (M) and receive antennas (N) involved. The common MIMO configurations used for various technologies are: (2×1), (1×2), (2×2), (4×2), (8×2) and (2×4), (4×4), (8×4). In addition, the Third Generation Partnership Project, 3GPP, has discussed extending the number of antennas at the base station up to 16/32/64.

It is well known that MIMO systems can significantly increase the data carrying capacity of wireless systems. For these reasons, MIMO is an integral part of the third and fourth generation wireless systems. In addition, massive MIMO systems are currently under investigation for fifth generation systems. MIMO systems may also include very large MIMO or VL-MIMO. VL-MIMO systems are also sometimes referred to as "full dimension" or FD systems.

In 3GPP Long Term Evolution, LTE, antenna mapping can be understood as a mapping from the output of the data modulation circuitry to the different antennas ports. The input to the antenna mapping thus includes the modulation symbols, such as QPSK, 16QAM, 64QAM, 256QAM symbols, corresponding to the one or two transport blocks. To be more specific, there is one transport block per Transmission Time Interval or TTI, except for spatial multiplexing, in which case there may be two transport blocks per TTI. The output of the antenna mapping is a set of symbols for each antenna port. The symbols of each antenna port are subsequently applied to the orthogonal frequency-division multiplexing, OFDM, modulator. That is, the symbols are mapped to the basic OFDM time-frequency grid corresponding to that antenna port.

Beamforming in the downlink represents an aspect of MIMO and preceding includes multiplying the signal with different beamforming weights for each antenna port prior to transmission. Base stations use beamforming to focus transmitted energy towards desired users—i.e., towards the wireless devices, or user equipments, UEs, being served at any given time. Focusing the radiated energy boosts coverage and raises the maximum data rates achievable on the downlink under real-world channel conditions. Accurate Channel State Information or CSI is a requisite for effective beamforming and acquiring accurate CSI in a scalable fashion for MIMO systems is non-trivial. In conventional systems, radio network nodes transmit per-antenna pilot signals, and UEs estimate downlink channel gain based on measurements of the pilot signals.

Regarding downlink data transfer in LTE, the UE computes the channel estimates from the pilot or reference signals and then computes the parameters needed for CSI reporting. The CSI report includes, for example, a Channel Quality Indicator or CQI, a Precoding Matrix Index PMI or PMI, and/or Rank Information, denoted as RI. The CSI report is sent to the eNodeB via a feedback channel, which is either a Physical Uplink Control Channel, PUCCH, for periodic CSI reporting, or a Physical Uplink Shared Channel, PUSCH, for aperiodic reporting. The eNodeB scheduler uses this information in choosing the parameters for scheduling of the UE. The eNodeB sends the scheduling parameters to the UE in the Physical Downlink Control Channel or PDCCH. The scheduling information includes a number of MIMO layers scheduled, transport block sizes, modulation for each codeword, parameters related to HARQ, and sub band locations. Subsequently, the actual data transfer takes place from the eNodeB to the UE.

Active-array-Antenna Systems or AAS integrate radio frequency power amplifiers and transceivers with an array of antennas elements and offer several benefits compared to traditional deployments with passive antennas connected to transceivers through feeder cables. Passive antennas array systems boost baseband signals, but are connected to the antennas by longer feedback cables. AAS reduces cable losses, improves performance, reduces energy consumption, requires less space for implementation, and simplifies installation.

There are many applications of AAS, such as cell-specific beamforming, user-specific beamforming, vertical sectorization, massive MIMO, vertical beamforming, and so on. AAS may also enable further-advanced antenna concepts, such as deploying a large number of MIMO antenna elements at the eNodeB. For these reasons, 3GPP started a study item investigating the feasibility of increasing the number of transmit antennas to 16/32/64 for various purposes and also extending the CSI feedback to support two-dimensional antenna arrays.

SUMMARY

In one aspect of this disclosure, a communication device sends first and second precoding reports to a network node by time multiplexing the first and second precoding reports onto a reporting channel in accordance with a multiplexing ratio. The first and second precoding reports comprise first and second precoding recommendations, respectively, and correspond to the first and second dimensions of an antenna array used for transmitting to the communication device. Among other advantages, multiplexing of the first and second reports enables the communication device to reuse a reporting channel and at least some of the underlying reporting protocols or signaling arrangements to report multi-dimensional precoding information. The corresponding network node uses its knowledge of the multiplexing ratio to differentiate between the first and second reports. Moreover, the involved multiplexing ratio may be adapted, either by the network or the communication device, in view of changing operating scenarios.

In an example embodiment, a communication device is configured for operation in a communication network and implements a method that includes a number of steps or operations, including receiving transmissions from an antenna array of a network node in the communication network. The antenna array has first and second dimensions, and the method includes determining precoding recommendations for transmitting to the communication device from the antenna array, based on evaluating the received transmissions. Further, the method includes sending first and second precoding reports to the network node by time multiplexing the first and second precoding reports onto a reporting channel in accordance with a multiplexing ratio. The first and second precoding reports comprise first and second precoding recommendations respectively corresponding to the first and second dimensions of the antenna array.

In another example embodiment, a communication device is configured for operation in a communication network and includes a communication interface circuit and a processing circuit. The communication interface circuit is configured to receive transmissions from an antenna array of a network node in the communication network, where the antenna array has first and second dimensions. Correspondingly, the processing circuit is configured to determine precoding recommendations for transmitting to the communication device from the antenna array, based on evaluating the received transmissions, and send, via the communication interface circuit, first and second precoding reports to the network node. In particular, the processing circuit multiplexes the first and second precoding reports onto a reporting channel in accordance with a multiplexing ratio. The first and second precoding reports comprise first and second precoding recommendations respectively corresponding to the first and second dimensions of the antenna array.

In another example embodiment, a network node is configured for operation in a communication network and implements a method that includes receiving precoding reports from a communication device, for use in precoding transmissions to the communication device from an antenna array. The precoding reports comprise first and second precoding reports sent by the communication device on a reporting channel in time-multiplexed fashion according to a multiplexing ratio. As before, the first and second precoding reports comprise first and second precoding recommendations respectively corresponding to first and second dimensions of the antenna array, and the method includes determining whether individual ones of the precoding reports comprise one of the first precoding reports or comprise one of the second precoding reports, based on the multiplexing ratio. Correspondingly, the method includes precoding transmissions to the communication device from the antenna array, according to precoding weights determined in consideration of the first and second precoding recommendations.

In a related example embodiment, a network node configured for operation in a communication network comprises a communication interface circuit and a processing circuit. The communication interface circuit is configured to receive precoding reports from a communication device, for use in precoding transmissions to the communication device from an antenna array. The precoding reports comprise first and second precoding reports sent by the communication device on a reporting channel in time-multiplexed fashion according to a defined multiplexing ratio. The first and second precoding reports comprise first and second precoding recommendations respectively corresponding to first and second dimensions of the antenna array, and the processing circuit is configured to determine whether individual ones of the precoding reports comprise one of the first precoding reports or comprise one of the second precoding reports, based on the defined multiplexing ratio. Further, the processing circuit is configured to precode transmissions to the communication device from the antenna array according to precoding weights determined in consideration of the first and second precoding recommendations.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
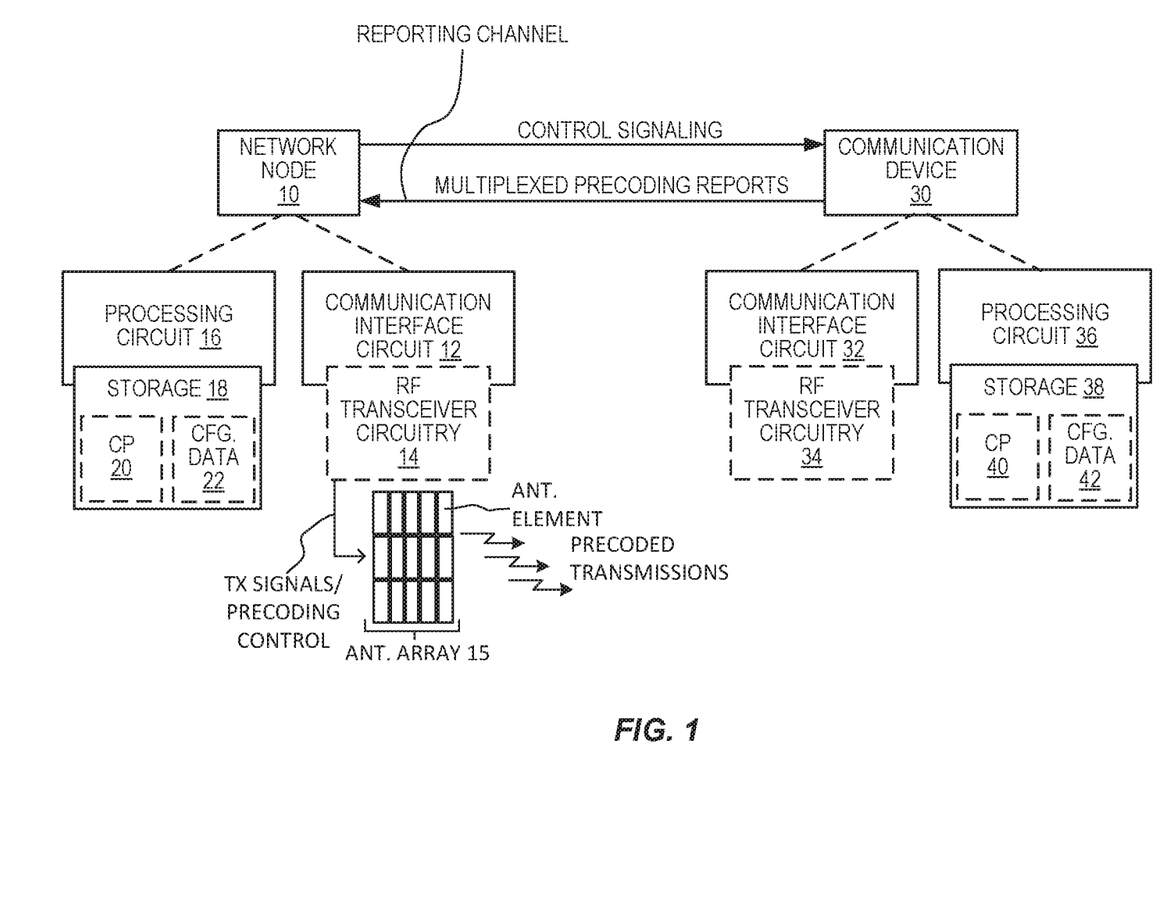
FIG. 1 is a block diagram of example embodiments of a network node and a communication device.

FIG. 1 illustrates an example network node 10 that includes a communication interface circuit 12, including radio frequency, RF, transceiver circuitry 14 and an associated antenna array 15. The network node 10 further includes a processing circuit 16 and associated storage 18, e.g., storing one or more computer programs 20 and one or more items of configuration data 22.

FIG. 1 further illustrates a communication device 30 that includes a communication interface circuit 32, including radio frequency, RF, transceiver circuitry 34 that includes or is associated with one or more transmit/received antennas at the device 30. The communication device 30 further includes a processing circuit 36 and associated storage 38, e.g., storing one or more computer programs 40 and one or more items of configuration data 42.

The network node 10 and the communication device 30 are configured for operation in a wireless communication network—not shown—and the network node 10 in particular is configured to transmit to the communication device 30 using the antenna array 15, and to precode one or more of those transmissions. To that end, the communication device 30 provides precoding recommendations to the network node 10 according to an advantageous multiplexing scheme whereby the communication device 30 multiplexes first and second precoding reports onto the same reporting channel, according to a multiplexing ratio.

The first and second precoding reports comprise precoding recommendations corresponding to first and second dimensions of the antenna array 15 and the communication device 30 can therefore be understood as advantageously providing multi-dimensional precoding feedback on a single reporting channel. Of course, the network node 10 operates according to complementary configuration details, whereby it receives and properly interprets the multiplexed reports, for use in controlling multi-dimensional precoding of transmissions to the communication device 30 from the antenna array 15.

In a non-limiting example, this arrangement can be understood as extending or reusing the infrastructure—channels, protocols, report formats, etc.—that were designed for reporting single-dimensional precoding recommendations. For example, the kind of single-dimensional PMI reporting heretofore seen in LTE systems is at least partially reused according to the teachings disclosed herein, and used for multi-dimensional PMI reporting without need for defining additional reporting channels to cover the added dimensions. Moreover, the multiplexing ratio can be adapted as needed, such that the reporting can be limited to a selected one of the antenna dimensions, or to report both dimensions according to essentially any bias or balance desired.

By way of example, the network node 10 comprises an LTE eNB or other type of network base station. Correspondingly, the example communication device 30 comprises a User Equipment or UE configured for operation in an LIE network. However, the communication device 30 may comprise essentially any type of wireless communication apparatus, including smartphones, tablets, computers or other wireless computing devices, a Machine Type Communication, MTC, node, such as used in Machine-to-Machine, M2M, networks, a modem, dongle, or other wireless adaptor, etc.

Figure 2:
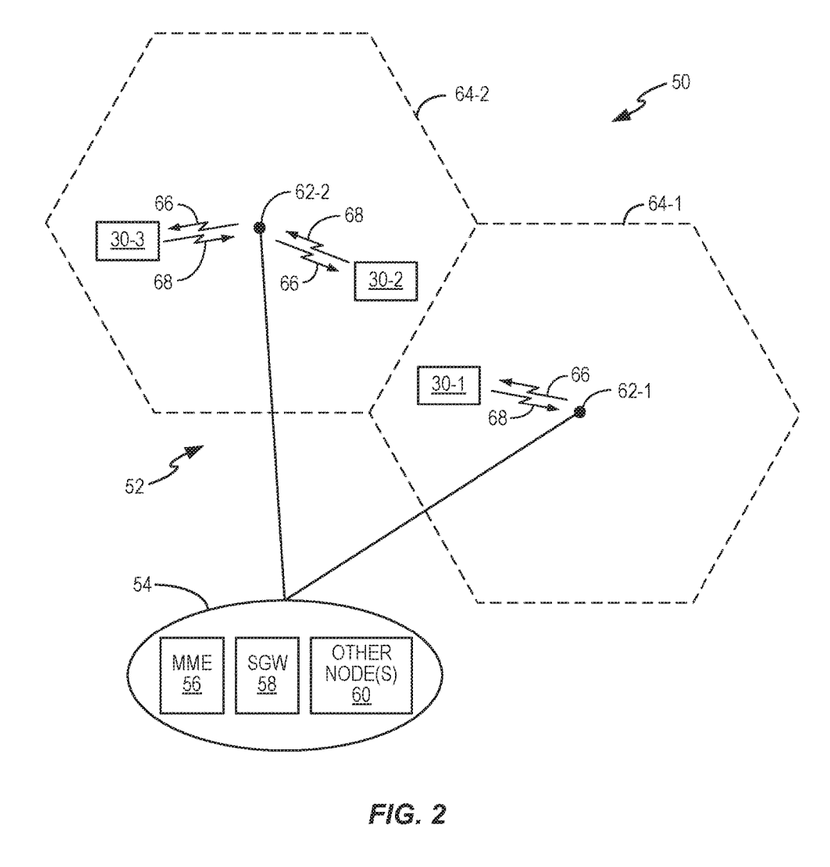
FIG. 2 is a block diagram of an example embodiment of a communication network.

FIG. 2 illustrates an example wireless communication network 50 in which the network node 10 and the communication device 30 may operate. In a non-limiting example, the wireless communication network 50 is a cellular communication network based on the LTE specifications promulgated by the 3GPP. The wireless communication network 50 includes a Radio Access Network (RAN) 52 and a Core Network (CN) 54. The RAN 52 includes one or more radio base stations 62, e.g., 62-1 and 62-2. Each radio base station 62 provides service in one or more cells 64. Here, the radio base station 62-1 provides cellular communication services in a cell 64-1 and the radio base station 62-2 provides cellular communication services in an adjacent cell 64-2. One or more communication devices 30 operate within the wireless communication network 50, e.g., 30-1, 30-2, 30-3, etc.

The CN 54 includes a number of nodes supporting the communication services, including a Mobility Management Entity (MME) 56, a Serving Gateway (SGW) 58, and one or more other nodes 60. The CN 54 may, of course, include any number of nodes not illustrated or discussed here, and it will be appreciated that the CN 54 is not germane to the focus of this disclosure.

A given one of the communication devices 30 receives a downlink transmission 66 from a radio base station 62 and sends an uplink transmission 68. One or more of the radio base stations 62 are configured to operate as the aforementioned network node 10 of FIG. 1. In some embodiments, the non-limiting term radio base station or simply network node is used. Network node refers to any type of network node that serves a communication device 30 and/or is associated with a node that provides service to one or more communication devices 30. Examples of network nodes 10 are Node B, base station (BS), multi-standard radio (MSR) node such as MSR BS, eNodeB, network controller, radio network controller (RNC), base station controller (BSC), relay, donor node controlling relay, base transceiver station (BTS), access point (AP), transmission point, transmission node, remote radio unit (RRU), remote radio head (RRH), a node in distributed antenna system (DAS), etc.

Returning to the communication device 30 of FIG. 1, the processing circuit 36 is operatively associated with the communication interface circuit 32 and is implemented using fixed circuitry, programmed circuitry, or some combination of fixed and programmed circuitry. In at least one embodiment, the processing circuit 36 is at least partly implemented using programmed circuitry and comprises, for example, one or more processor circuits, such as one or more microprocessors, Digital Signal Processors (DSPs), Application Specific Integrated Circuits (ASICs), Field Programmable Gate Arrays (FPGAs), or other digital processing circuitry. Correspondingly, the processing circuit 36 includes or is associated with one or more types of computer-readable media—"STORAGE 38" in the figure—such as one or more types of memory circuits such as FLASH, EEPROM, SRAM, DRAM, etc. Additionally, or alternatively, the storage 38 comprises hard disk storage, Solid State Disk (SSD), storage, etc.

In general, the storage 38 provides both working memory and longer-term storage. In at least one embodiment, the storage 38 provides non-transitory storage for a computer program 40 and one or more items of configuration data 42. Here, non-transitory does not necessarily mean permanent or unchanging storage but does means storage of at least some persistence—i.e., holding information for subsequent retrieval. The computer program 40, which may comprise a number of related or supporting programs, comprises program instructions that, when executed by the processing circuit 36, configure the communication device 30 to operate according to the examples described herein.

In at least some embodiments, the communication interface circuit 32 is configured to receive transmissions from an antenna array 15 of a network node 10 in the communication network 50, where the antenna array 15 has first and second dimensions—such as a horizontal or azimuthal dimension and a vertical or elevation dimension. The processing circuit 36 is configured to determine precoding recommendations for transmitting to the communication device 30 from the antenna array 15, based on evaluating the received transmissions, and to send, via the communication interface circuit 32, first and second precoding reports to the network node 10 by time multiplexing the first and second precoding reports onto a reporting channel in accordance with a multiplexing ratio.

The multiplexing ratio may be a default value, a value determined by the network 50, a value determined by the communication device 30, or a value determined cooperatively between the network 50 and the communication device 30. Further, the multiplexing ratio may change over time—i.e., be dynamically updated—as a consequence of changing operating scenarios. In any case, the first and second precoding reports comprise first and second precoding recommendations respectively corresponding to the first and second dimensions of the antenna array 15.

Figure 3:
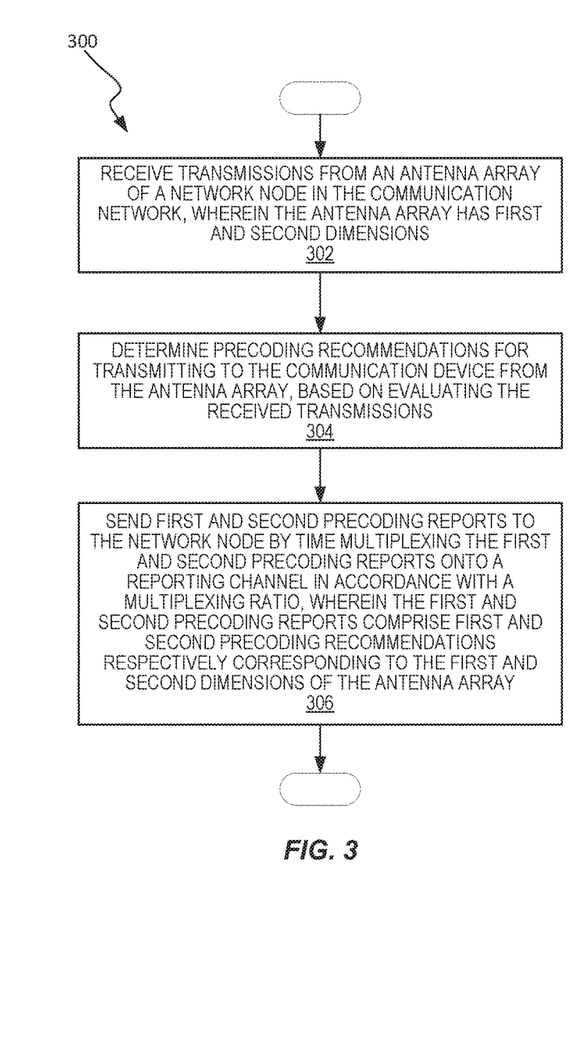
FIG. 3 is a logic flow diagram of an example embodiment of a method implemented by a communication device.

Whether or not it is implemented according to the example circuitry of FIG. 1, a communication device 30 in one or more embodiments is configured to perform the method 300 shown in FIG. 3. The method 300 includes receiving transmissions from an antenna array 15 of a network node 10 in the communication network 50 (Block 302), where the antenna array 15 has first and second dimensions. The method 300 also includes determining precoding recommendations for transmitting to the communication device 30 from the antenna array 15, based on evaluating the received transmissions (Block 304). The method 300 further includes sending first and second precoding reports to the network node 10 by time multiplexing the first and second precoding reports onto a reporting channel in accordance with a multiplexing ratio (Block 306). The first and second precoding reports comprise first and second precoding recommendations respectively corresponding to the first and second dimensions of the antenna array 15.

The reporting cycle may include N precoding reports sent from the communication device 30 to the network node 10, 62 on the reporting channel, and the multiplexing ratio may stipulate that M first precoding reports and (N−M) second precoding reports are sent in every reporting cycle, where N is an integer and M is an integer less than or equal to N.

In some cases, one of the first and second dimensions is prioritized over the other one of the first and second dimensions, and the multiplexing ratio reflects the prioritization. The prioritization may be changed in dependence on any one or more of: control signaling incoming from the communication network 50, channel conditions at the communication device 30 and/or a location of the communication device 30.

In some embodiments, the method 300 includes setting the multiplexing ratio to a value determined in dependence on any one or more of: an application or service type associated with the communication device 30, a mobility profile of the communication device 30, historical data corresponding to past usage of one or more multiplexing ratios, historical or current communication performance of the communication device 30, and a current location of the communication device 30. In an example implementation, a mobility profile comprises one or more of: a Doppler metric or speed of the communication device 30, an acceleration of the communication device 30, a direction of motion of the communication device 30, and a change in a location of the communication device 30. As a further example, historical data corresponding to past usage of one or more multiplexing ratios may comprise statistics regarding prior use of the ratio M/N by the communication device 30 and/or by one or more similarly situated devices.

A "similarly situated" device is, for example, a device that is or was operated in the same service or geographic area the communication device 30 is operating in. Additionally, or alternatively, a similarly situated device is one that had or has a mobility profile that is the same or similar to the current mobility profile of the communication device 30. In any case, such data in one or more embodiments includes one or more performance measures for each of one or more multiplexing ratio settings, such that the data provides a basis for comparing communication performance between different settings—e.g., in terms of any of throughput, error rates, retransmission statistics, link failures, etc. In this manner, the multiplexing ratio may be set to a value that is historically associated with better performance, for the area or service conditions currently applicable to the communication device 30

As noted, the mobility profile of the communication device 30 includes any one or more of: a Doppler metric or speed of the communication device 30; an acceleration of the communication device 30; a direction of motion of the communication device 30; and a change in the location of the communication device 30. The speed and direction of the communication device 30 may also be considered a velocity of the communication device 30, and evaluation of velocity may be used to determine the priority of reporting as between horizontal and vertical dimensions of the antenna array 15. Broadly, any one or any combination of mobility, location, service type(s), reception conditions, etc., may be referred to as "service conditions," and it is contemplated herein to set the multiplexing ratio in dependence on service conditions. Such setting may be performed by the communication device 30, by the network node 10, or cooperatively by the communication device 30 and the network node 10.

According to some embodiments, one of the first and second dimensions is a horizontal dimension and the other one of the first and second dimensions is a vertical dimension. Correspondingly, the first precoding reports comprise one of horizontal precoding reports and vertical precoding reports and the second precoding reports comprise the other one of the horizontal precoding reports and the vertical precoding reports. Each horizontal precoding report may indicate a horizontal precoding matrix recommendation comprising antenna element weights corresponding to the horizontal dimension of the antenna array 15, and each vertical precoding report may indicate a vertical precoding matrix recommendation comprising antenna element weights corresponding to the vertical dimension of the antenna array 15.

Although it may comprise more complicated circuitry, the processing circuit 16 of the network node 10 may, like the processing circuit 36 of the communication device 30, be implemented in fixed circuitry, programmed circuitry, or some combination of fixed and programmed circuitry. In at least one embodiment, the processing circuit 16 is at least partly implemented using programmed circuitry. In one or more such embodiments, the processing circuitry 16 comprises more processor circuits, such as one or more microprocessors, DSPs, ASICs, FPGAs, or other digital processing circuitry. Correspondingly, the processing circuit 16 includes or is associated with one or more types of computer-readable media—"STORAGE 18" in the figure—such as one or more types of memory circuits such as FLASH, EEPROM, SRAM. DRAM, etc. Additionally, or alternatively, the storage 18 comprises hard disk storage, SSD storage, etc.

In general, the storage 18 provides both working memory and longer-term storage. In at least one embodiment, the storage 18 provides non-transitory storage for a computer program 20 and one or more items of configuration data 22. The computer program 20, which may comprise a number of related or supporting programs, comprises program instructions that, when executed by the processing circuit 16, configure the network node 10 to operate according to the examples described herein.

In at least some embodiments, the communication interface circuit 12 is configured to receive precoding reports from a communication device 30, for use in precoding transmissions to the communication device 30 from an antenna array 15. The precoding reports comprise first and second precoding reports sent by the communication device 30 on a reporting channel in time-multiplexed fashion according to a multiplexing ratio. The first and second precoding reports comprise first and second precoding recommendations respectively corresponding to first and second dimensions of the antenna array 15. The processing circuit 16 is configured to determine whether individual ones of the precoding reports comprise one of the first precoding reports or comprise one of the second precoding reports, based on the multiplexing ratio. Correspondingly, the processing circuit 16 is configured to precode transmissions to the communication device 30 from the antenna array 15, according to precoding weights determined in consideration of the first and second precoding recommendations.

Figure 4:
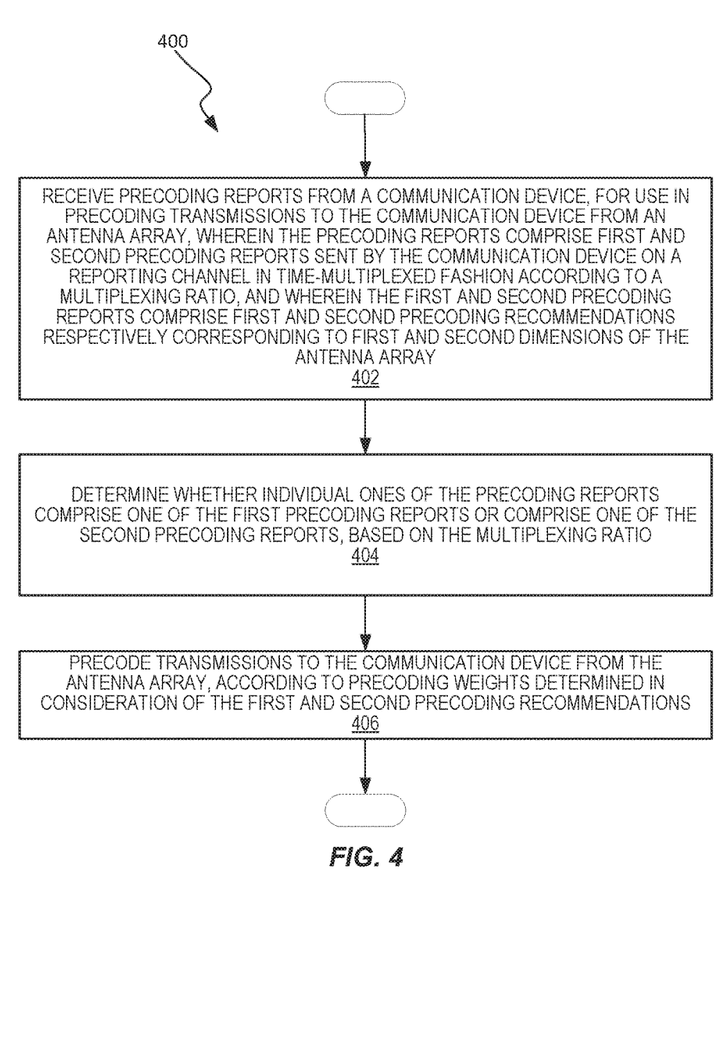
FIG. 4 is a logic flow diagram of an example embodiment of a method implemented by a network node.

Regardless of its implementation details, it is contemplated herein to configure a network node 10 to implement the method 400 of FIG. 4. The method 400 includes receiving precoding reports from a communication device 30, for use in precoding transmissions to the communication device 30 from an antenna array 15 (Block 402). The precoding reports comprise first and second precoding reports sent by the communication device 30 on a reporting channel in time-multiplexed fashion according to a multiplexing ratio. The first and second precoding reports include first and second precoding recommendations respectively corresponding to first and second dimensions of the antenna array 15. The method 400 also includes determining whether individual ones of the precoding reports comprise one of the first precoding reports or comprise one of the second precoding reports, based on the multiplexing ratio (Block 404). The method 400 further includes precoding transmissions to the communication device 30 from the antenna array 15, according to precoding weights determined in consideration of the first and second precoding recommendations (Block 406).

In at least one embodiment, determining whether individual ones of the precoding reports comprise one of the first or second precoding reports comprises determining whether individual ones of the precoding reports comprise one of the first or second precoding reports based on a reporting cycle over which the multiplexing ratio applies. For example, the reporting cycle comprises N precoding reports sent from the communication device 30 on the reporting channel, and the multiplexing ratio stipulates that M first precoding reports and (N−M) second precoding reports are sent in every reporting cycle, where N is an integer and M is an integer less than or equal to N.

At least one embodiment of the method 400 includes indicating the multiplexing ratio via signaling sent to the communication device 30. Further, one or more embodiments of the method 400 include the network node 10 receiving a multiplexing ratio recommendation from the communication device 30 and determining the multiplexing ratio in consideration of the multiplexing ratio recommendation. The processing circuit 16 is configured to implement such functions, for example.

The multiplexing ratio may also be set in dependence on a prioritization between the first and second dimensions of the antenna array 15. Advantageously, the prioritization may be determined dynamically—i.e., updated from time to time—based on operating scenario changes. As an example of changed operating scenarios, the channel conditions may be expected to change over time. These changes may be determined directly, e.g., from CSI reports or channel tracking, or they may be determined indirectly, e.g., from communication performance metric tracking. In an example case, Bit Error Rate (BER) of Block Error Rate (BLER) may be tracked as a measure of communication performance. In any case, the prioritization may be determined in dependence on channel conditions at the communication device 30 and/or a location of the communication device 30. For example, the network node 10 tracks or has access to location information that indicates specific multiplexing ratios, or at least indicates multiplexing ratio biases, for different locations relevant to the service areas) covered by the network node 10.

Broadly, in one or more embodiments, the method 400 includes setting the multiplexing ratio in dependence on one or more of: an application or service type associated with the communication device 30; a mobility profile of the communication device 30; historical or current communication performance of the communication device 30; historical data corresponding to past usage of one or more multiplexing ratios; and a current location of the communication device 30.

The multiplexing ratio, in some cases, defines a pattern of first and second precoding reports within a reporting cycle. Correspondingly, determining whether individual ones of the precoding reports comprise one of the first or second precoding reports comprises receiving a given precoding report, determining a position of the given precoding report within the pattern, and determining whether the position corresponds to the first precoding reports or to the second precoding reports. In other words, the network node 10 knows or detects the start of a precoding reporting cycle, knows the multiplexing ratio in use at the communication device 30, and knows the reporting pattern within each reporting cycle to be used for sending the first and second precoding reports. Thus, any given received precoding report can be identified by the network node 10 as being one of the first precoding reports, or as being one of the second precoding reports.

Now, consider that 3GPP LTE provides several different variations on MIMO techniques, from beamforming to spatial multiplexing or single antenna schemes through selection of one of 10 Transmission Modes (TMs). These TMs are explained below.

Transmission mode 1: Single Transmit Antenna Mode. This mode is mandatory for all terminals and used for eNodeB which as only a single transmit antenna, for example small cells eNodeBs. This can also be used for macro eNodeBs in cases where using more than 1Tx antenna is not feasible (e.g., certain antenna sharing scenarios with other 2G/3G technologies).

Transmission mode 2: Open Loop Transmit Diversity Mode. In this mode, the same information is transmitted through multiple antennas, each with different coding/frequency resources. Alamouti codes are used with 2 antennas as the Space Frequency Block Codes (SFBC). This transmission scheme is also a common fallback mode to single layer transmission with dynamic rank adaptation in other transmission modes. This uses Space Frequency Block Coding (SFBC) for 2TX and SFBC+Frequency Shift Time Diversity (FSTD) STX for 4TX.

Transmission mode 3: Open Loop Spatial Multiplexing with Cyclic Delay Diversity and Open Loop Transmit Diversity. This mode is also called open loop single user MIMO. As an open loop mode, this requires no PMI but only rank is adapted. Due to its simplicity, this is the widely deployed mode during the initial deployments of 3GPP LTE.

Transmission mode 4: Closed Loop Spatial Multiplexing (SU MIMO for rank 2 to 4). This has been the primary configuration for the majority of initial Release 8/9 deployments, operating while the channel has rank 2 to 4. It multiplexes up to four layers onto up to 4 antennas. To allow the UE to estimate the channels needed to decode multiple streams, the eNodeB transmits Common Reference Signals (CRS) on prescribed Resource Elements. The UE replies with the PMI indicating which precoding is preferred from the pre-defined codebook. This is used for Single User, SU-MIMO. When the UE is scheduled, a precoding matrix is selected and the UE is informed explicitly or implicitly which precoding matrix was used for the actual PDSCH transmission.

Transmission mode 5: Closed-Loop Multi-User MIMO For rank 2 to 4. This mode is similar to TM4 but for the multi-user case, where multiple users are scheduled within the same resource block.

Transmission mode 6: Closed Loop Rank 1 Precoding. This mode uses PMI feedback from the UE to select the preferred (one layer) codebook entry (precoding vector) from the pre-defined rank 1 codebook. Since only rank 1 is used, beamforming gain is expected in this mode but no spatial multiplexing gain.

Transmission mode 7: Single Layer Beamforming. In this mode, both the data and the demodulation Reference Signals (DMRS) are transmitted with the same UE-specific antenna precoder so that the UE does not distinguish the actual number of physical antennas used in the transmission and it does not know the actual precoding weights used as in the classical beamforming approach (TM6). TM7 is mainly used with TD-LTE where the downlink channel state is well characterized by uplink measurements, due to reciprocity.

Transmission mode 8: Dual layer beamforming. This mode was introduced in Release 9. TM8 does classical beam forming with UE specific DMRSs, like TM7 but for dual layers. This permits the eNodeB to weight two separate layers at the antennas so that beamforming can be combined with spatial multiplexing for one or more UEs. The two layers can be targeted to one or two UEs.

Transmission mode 9: 8 layer MU-MIMO, Introduced in Release 10, as part of LTE-Advanced, TM9 implements 2, 4 or 8 reference signals for measurements (CSI-RS) as well as 1 to 8 UE specific reference signals for demodulation (DMRS). Hence, it is a generalization of TM8 for up to 8 layer transmission and the introduction of CSI-RS enhances the CSI feedback. It is suitable for MU-MIMO with dynamic switching from SU-MIMO. It is applicable to either TDD or FDD systems and it is mandatory for terminals of Release 10 or later.

Transmission mode 10: An enhancement of TM9 where the resources used interference measurements has been further defined by the introduction of CSI-IM. TM10 is optional for terminals of Rel.11 or later.

Precoding may include multiplying the signal with different beamforming weights for each antenna port prior to transmission. A typical approach is to tailor the precoder to the antenna form factor. Precoder codebooks tailored for 2D antenna arrays may combine precoders tailored for a horizontal array and a vertical array of antenna ports respectively by means of a Kronecker product. This means that (at least part of) the precoder can be described as a function of $$W_h \otimes W_v$$

where $W_h$ is a horizontal precoder taken from a (sub)-codebook $X_h$ and similarly $W_v$ is a vertical precoder taken from a (sub)-codebook $X_v$.

Now consider an example 2D antenna system. The received signal for the $i^{th}$ subcarrier can be written as $$Y = HWx + n$$

where H is the 3 dimensional channel matrix between the transmitter antenna elements dimensions ($N_r \times N_h \times N_v$), W is the 3 dimensional precoding matrix of dimensions ($N_h \times N_v \times R$) and x is the transmitted signal vector of size (R×1), where $N_r$ is the number of receiver antennas, $N_h$ is the number of transmit antennas in the horizontal direction and $N_v$ is the number of antenna elements in vertical direction per each horizontal branch and R is the transmission rank of the system. Most antennas used today are equipped with dual-polarized elements. Normally two orthogonal polarizations are created such as vertical/horizontal, +45/−45 slanted or left/right circular polarization. Beamforming is normally done per polarization where the fading correlation is high, while the polarization dimension is used to transmit different data streams (spatial multiplexing). For beamforming (between elements of same polarization) R=1 (since rank=1). However, various embodiments are also applicable when the rank is greater than 1.

The 3 dimensional precoding matrix can be written as $$W = \text{Kron}(W_h, W_v) = W_h \otimes W_v$$

where $W_h$ is the horizontal PMI and $W_v$ is the vertical PMI. Hence it can be seen that the UE needs to send PMIs in two directions, one in the horizontal direction and another in the vertical direction in its CSI reporting. Consequently, there is significant overhead in the uplink direction.

Various embodiments described herein provide for reporting the PMIs in two directions, without increasing the uplink overhead and at the same time reducing the standardization effort. This means that the conventional CSI reporting schemes can be used. Normally, a UE's movement is only in one dimension, either the UE moves in a vertical direction or a horizontal direction, but seldom in both dimensions. Accordingly, the PMIs in one direction do not change rapidly. For example, when the UE is in the vertical domain, $W_v$ changes are minimal. In such cases, reporting $W_v$ the same way $W_h$ is reported will increase overhead.

Figure 5:
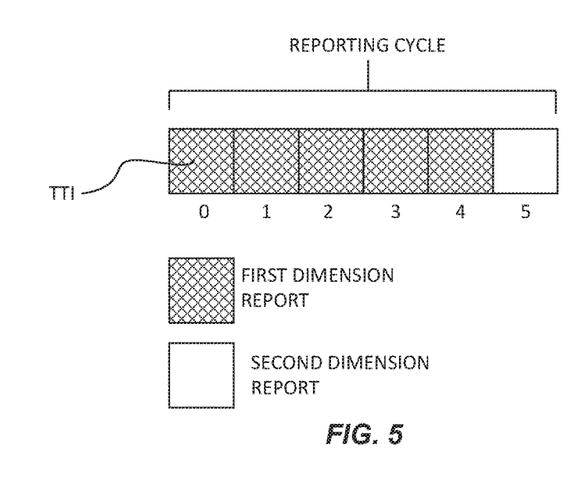
FIG. 5 is a diagram of an example multiplexing ratio and associated reporting cycle, for use in multiplexing first and second types of precoding reports onto the same reporting channel.

Accordingly, two more embodiments are described to configure the communication device 30 for reporting horizontal and vertical PMIs. In a first embodiment, a pre-defined ratio is used. The network node 10, such as an eNodeB, configures the communication device 30 to report the PMIs using a pre-defined ratio M/N. This means that out of N consecutive CSI reports, the M are of horizontal PMIs and N−M are of vertical PMIs. For example, the network node 10 and the communication device 30 agree to a pre-configured M/N set such as M_PMI_h/N_PMI={1/2, 2/3, 3/4, 4/5, 5/6, 6/7, 7/8, 8/9, 9/10, 1/1} and the network node 10 sets this value to 9/10. Then, the network node 10 expects that out of ten PMI reports (sub band and/or wideband), the first nine reports should be horizontal PMI and the tenth report should be vertical PMI. FIG. 5 shows an example M/N ratio for PMI configuration.

In FIG. 5, the reporting cycle encompasses six TTIs, and the communication device 30 sends five of the first reports and one of the second reports in each reporting cycle. Thus, in an example case, the multiplexing ratio could be expressed as 5:1. Note that each block corresponds to the CSI reporting TTI. In another example, the communication device 30 may be configured to only report CSI in every second TTI of the reporting cycle. The reporting cycle may still encompass six TTIs as in FIG. 5. However, the communication device 30 is configured to send reports only in TTI 1, 3 and 5, and to not send any reports in TTI 2, 4, and 6. With a multiplexing ratio of 2/6, the communication device 30 will thus send one of the first reports and two of the second reports in each reporting cycle, with an empty TTI in between them. Similarly, the communication device 30 may be configured to send each CSI report twice in subsequent TTIs of the reporting cycle for the purpose of increasing the reliability. With a multiplexing ratio of 2/6, the communication device 30 will thus send one of the first reports and two of the second reports in each reporting cycle, where each report is sent twice in subsequent TTIs of the reporting cycle.

Further, the multiplexing ratio may be varied to reflect changing operating conditions—i.e., a changing operating scenario. Similarly, the overall reporting cycle and the pattern of first and second reports within each reporting cycle may be adapted. In general, the communication device 30 reports preceding information for two or more dimensions of a transmit antenna array by multiplexing reports for the different dimensions onto a reporting channel, according to a defined multiplexing ratio, which can be understood as defining or corresponding with a "reporting pattern". The reporting pattern may be characterized by the overall reporting cycle, the ratio or mix of the dimensional reports within each cycle, whether or to what extent redundant reporting is used within the cycle, and so on.

In any case, the contemplated multi-dimensional reporting approach taught herein allows legacy feedback channel structures to be used for reporting both horizontal PMI as well as vertical PMI. Broadly, a "legacy" reporting structure is one designed for reporting PMI in one dimension. As a specific example, the reporting structures defined in 3GPP technical specifications released prior to Release 13 exemplify legacy reporting structures.

Figure 6:
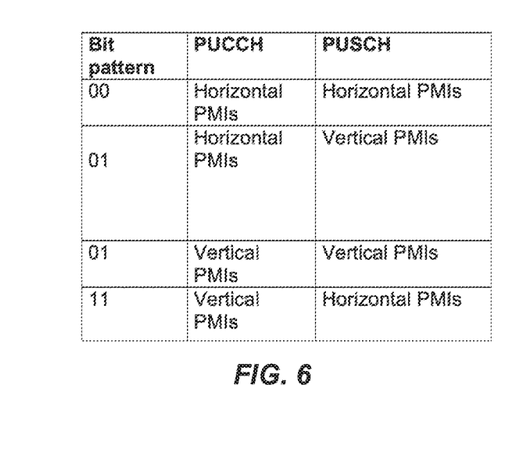
FIG. 6 is a diagram of an example bit map and corresponding bit map patterns, for efficiently signaling configuration information for precoding reporting.

In a second embodiment of the teachings herein, two different channels are used to report PMI of more than one dimension. The LTE standard provides for periodic reporting of CSI on the PUCCH and for aperiodic reporting of CSI on the PUSCH. It is contemplated herein that one or more embodiments of the network node 10 determine a rule and indicate to the communication device 30 that all periodic reports should contain horizontal PMIs, while all aperiodic reports should contain vertical PMIs, or vice versa. Hence, as an example, the network node 10 can obtain horizontal PMI information using regular CSI reporting PUCCH and whenever it needs a vertical PMI, it can inform the communication device 30 to report vertical PMIs, or vice versa. For instance, the network node can use the hit pattern or bit combination shown in FIG. 6 to indicate to the communication device 30 what type of PMI information it should report. Note that in this embodiment, the legacy feedback channel structures are used for PUCCH and PUSCH reporting, while benefiting from horizontal and vertical beamforming.

According to some embodiments, the network node 10 conveys the PMI configuration. Note that once the network node 10 decides the ratio of horizontal PMIs and vertical PMIs, or whether to use periodic and aperiodic PMI reports, it has to inform the communication device 30 using higher layer signaling (e.g. RRC), Medium Access Control or MAC layer signaling, or physical layer signaling, such as via the PDCCH.

Downlink reference signals are predefined signals occupying specific resource elements within the downlink time-frequency grid. The LTE specification includes several types of downlink reference signals that are transmitted in different ways and used for different purposes by the receiving terminal. For example, cell-specific reference signals (CRS) can be used by the terminal for channel estimation for coherent demodulation of downlink physical channels (except physical downlink shared channel, or PDSCH) and to acquire CSI. Demodulation reference signals (DM-RS) are specifically intended to be used by terminals for channel estimation for PDSCH. CSI reference signals (CSI-RS) are used by terminals to acquire CSI when demodulation reference signals are used for channel estimation.

Figure 7:
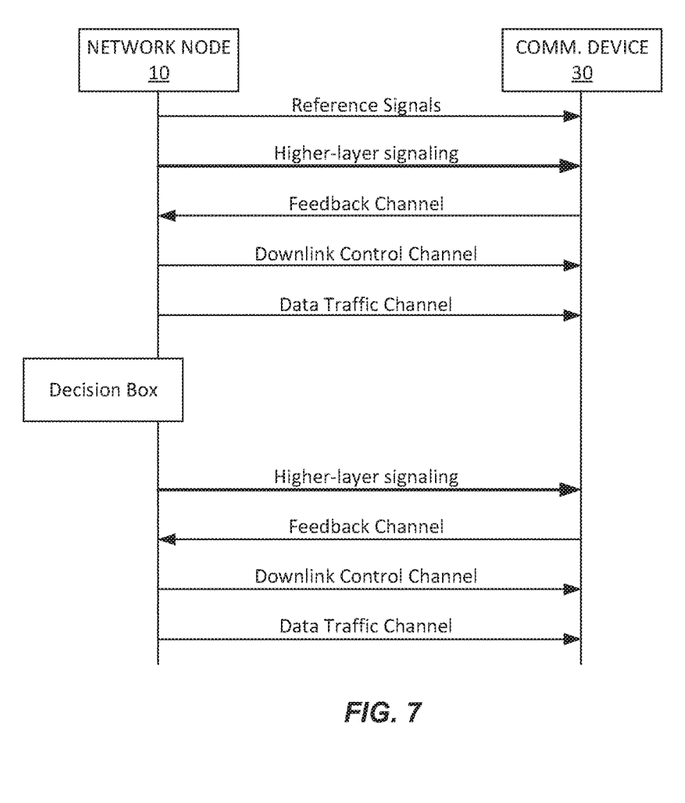
FIG. 7 is a signal flow diagram of an example signaling interchange involving one aspect of precoding reporting.

FIG. 7 shows an example message sequence diagram, involving higher layer signaling. Reference signals (CRS, CSI-RS, DM-RS) are transmitted based on the present need. The network node 10 sends a PMI configuration message using higher layer signaling (e.g. Radio Resource Control or RRC signaling). The message either contains the ratio M/N or a bit pattern indicating the multi-dimensional PMI reporting configuration to be used by the communication device 30. Based on the reports or other information, the network node 10 may possibly change the configuration as shown in FIG. 7. For example, if the network node 10 senses that communication device 30 movement is in one direction and the other direction is constant, then the network node 10 can signal to change the M/N ratio or the bit pattern as shown in FIG. 7.

Therefore, in some cases, the network node 10 configures the communication device 30 for reporting two types of PMI using a pre-defined ratio M/N, while still using the legacy feedback channel CSI reporting using higher layer signaling. In other cases, the network node 10 configures the communication device 30 for reporting two types of PMI using a pre-defined table such that one type of PMIs should be reported on one type of channel and the other type of PMIs should be reported on the second channel, while still using the legacy feedback channel CSI reporting using higher layer signaling.

Figure 8:
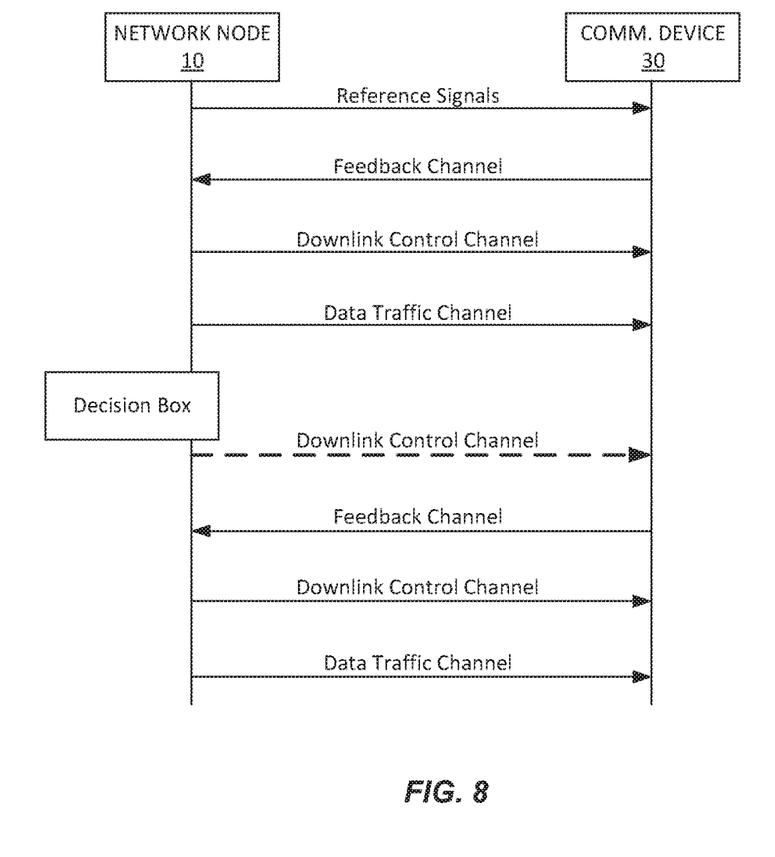
FIG. 8 is a signal flow diagram of an example signaling interchange involving another aspect of precoding reporting.

The network node 10 may also send the signaling about the change of PMI reporting using physical layer signals, such as shown in FIG. 8. This signaling may use the downlink control channel, e.g., by coopting an unused combination in the control channel structure. This method is useful as it reduces the latency compared to the use of higher layer signaling. Therefore, in some cases, the network node 10 uses physical layer signaling to configure PMI reporting by the communication device 30. For example, the network node 10 indicates the value of the multiplexing ratio to be used by the communication device 30 for multiplexing first and second precoding reports onto the same reporting channel.

In one or more other embodiments, a bitmap or table index can be signaled to indicate a table entry that corresponds to a desired configuration for reporting horizontal and vertical PMI. Further, such reporting schemes may be defined to allow for physical-layer CSI reporting by the communication device 30 that remains compatible with the legacy definitions.

Further, the PMI configuration parameters determined by the network node 10 may be based one or more variables. For example, the network node 10 determines the PMI configuration parameters, such as the multiplexing ratio or reporting channel configuration, based on one or more of: the application or service type (use case); a Doppler metric of the communication device 30 or the communication device 30 speed; a varying or unpredictable communication device 30 mobility profile; a measured performance of the communication device 30; statistical data regarding one or more multiplexing ratios previously used by the communication device 30; and precoding recommendations sent from the communication device 30.

Based on the application or service type, the network node 10 can decide the M/N ratio or the bit pattern entry in the bitmap. Such examples include whether the communication device 30 to be served is located indoors, in a high rise building, on floor level in a large building, etc. For instance, in a vertical beamforming scenario (e.g. high rise building or areas with skyscrapers), the communication device 30 can be configured with high values of M/N. This means that horizontal PMIs are reported frequently. This is because the communication device 30 may move on the same floor with no change in the vertical direction. Similarly for vertical beamforming, it can send the bit pattern where the PUCCH report consists of horizontal PMIS, while the PUSCH report consists of vertical PMIS. The network node 10 can determine whether the communication device 30 is located in a vertical beamforming scenario based on the communication device's 30 location information and a pre-defined knowledge of geographical area. Such knowledge may include the height of buildings, etc. Therefore, in some embodiments, the M/N ratio and/or the bit pattern for PMI configuration is set up based on the application or service type.

In some embodiments, the M/N ratio or the bit pattern can be set based on a mobility profile of the communication device 30. The mobility profile may include the Doppler metric of the communication device 30 and/or the speed of the communication device 30 in a specific direction. For example, the communication device 30 may be moving with a speed below a threshold, such as 3 km/hr, in the vertical direction. In this realistic scenario, a high value of M/N is used. But if the communication device 30 is moving with a speed above a threshold in the vertical direction, then a lower value of M/N is used.

On the other hand, if the communication device 30 is moving with a speed above a threshold, such as 5 km/hr, in the horizontal direction, then a high value of M/N is used. This may be a more realistic scenario where horizontal PMIs are reported frequently.

Note that there are many methods to compute a Doppler metric. For example, the network node 10 can compute the direct speed of the communication device 30. The positioning method may use observed time difference of arrival (OTDOA), enhanced cell ID, or a global navigation satellite system (GNSS), such as a global positioning system (GPS), at multiple intervals. The Doppler metric may then be an average of the individual speed measurement.

The communication device's 30 speed may also be determined by the network node 10, by measuring Doppler frequency on the received signals transmitted by the communication device 30, etc. For example, the network node 10 estimates the signals received at the uplink channel transmitted by the communication device 30. The rate of change of the received uplink channel gives a measure of the Doppler metric. Therefore, in some embodiments, the M/N ratio and/or bit pattern for PMI configuration is set up based on the speed of the communication device 30.

In addition to a direction of motion, the mobility profile may also include an acceleration of the communication device 30, a direction of motion of the communication device 30 and/or a change in the current location of the communication device 30.

In cases where the communication device 30 mobility profile is unpredictable or cannot be reliably determined, then the network node 10 may decide to use a particular value of M/N for the communication device 30. In one example, the particular value may be the one which would require the communication device 30 to report vertical and horizontal PMIs with equal proportion, where M/N=1/1. In another example, the particular value may be one that is, in the recent past, most commonly used for this communication device 30.

The measured performance of the communication device 30 may be considered. In this case, the network node 10 initially configures the communication device 30 with any suitable value of M/N, such as a value based on any one or more criteria. The network node 10 then uses the received PMIs from the communication device 30 to schedule the communication device 30 with precoded data and observe the communication device's 30 performance. An example observation may be the number of retransmissions of data block, or the HARQ performance. Another observation may be the UE bit rate. If the communication device's 30 performance is outside of a threshold, then the network node 10 selects the next possible or closest value of M/N and configures the communication device 30 with the selected value. For example, if the bit rate is below a threshold and/or the number of retransmissions is above a threshold, then the network node 10 reconfigures the communication device 30 with the new value of M/N until the communication device's 30 performance is within the desired threshold.

According to some embodiments, the network node 10 maintains historical data, which may include statistics related to the use of the ratio M/N assigned to one or more of the communication devices 30. These statistics may consider communication devices 30 that are around the same geographical location and/or have a similar mobility profile. This information can be maintained and updated in the form of a lookup table relating the assigned M/N ratio to the communication device's 30 geographical location and/or mobility profile. Therefore, in the case of a new communication device 30, the network node 10 determines the location and/or mobility profile of the new communication device 30 and assigns it an M/N ratio using the lookup table. In one or more embodiments, the communication device 30 maintains relevant historical ratio use data, and uses that data for setting a multiplexing ratio.

The communication device 30 may also determine the M/N ratio or the bit pattern of PMI configuration based on the channel measurements. It can then inform the network node 10 about the PMI configuration parameters. In addition, the communication device 30 may determine the parameters based on a number of criteria. Such criteria may include the communication device's 30 location, such as whether the communication device 30 is at ground level or above a height threshold. The criteria may also include mobility attributes, such as the speed, direction of motion and/or acceleration of the communication device 30. The communication device's 30 location may be determined based on one or more existing positioning methods. This may include GNSS such as UPS, OTDOA, enhanced cell ID, fingerprinting or a combination thereof.

If the communication device 30 determines that it is located at a height above a threshold, such as above 30 meters, then the communication device 30 may recommend that a high value of M/N be used. The communication device 30 may also recommend a bit pattern where horizontal PMI reporting is on PUCCH and vertical PMI reporting is on PUSCH.

The communication device 30 can determine its speed based on an estimation of a. Doppler frequency. If the communication device's 30 speed is below a threshold, then the communication device 30 can recommend a high value of M/N. The recommendation may also be a bit pattern where horizontal PMI reporting is on PUCCH and vertical PMI reporting is on PUSCH.

According to some embodiments, the network node 10 uses a combination of two or more criteria described above for determining the PMI configuration parameters. The network node 10 may also combine the results of its own determined M/N ratio and the communication device's 30 reported M/N ratio to determine one composite value of M/N based on a function. Examples of functions are average, maximum, minimum, etc. In yet another example, if the two sets of values of M/N differ by a large margin, then the network node 10 may discard the communication device 30 reported M/N ratio and instead use its own determined M/N for configuring the communication device 30.

Therefore, according to some embodiments, the M/N ratio and/or bit pattern for PMI configuration may be recommended as determined in the communication device 30 and based on the communication device's 30 speed and/or location.

In some embodiments CSI-RS is used for simplicity. However, various embodiments are also applicable to any type of reference signal (e.g. pilot signals) or any known sequence or signals that can be transmitted in a radio resource from an antenna element belonging to any antenna system. The radio resource can be a resource element, which in turn can be a time-frequency resource. The terms element, elements and antenna ports are also interchangeably used but carry the same meaning in this disclosure.

The embodiments are described in particular for LTE/LTE-A. The embodiments are however applicable to any RAT or multi-RAT system where the UE operates using multiple carriers e.g. LTE FDD/TDD, WCMDA/HSPA, GSM/GERAN, Wi Fi, WLAN, WiMax, CDMA2000 etc. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that the described solutions equally apply for Multi RAB (radio bearers) on some carriers (that is data plus speech is simultaneously scheduled).

Functional modules or circuit architecture may be implemented in a communication device 30, e.g., based on the processing circuitry 36. In an example, the implementation at least functionally includes a receiving module for receiving transmissions from an antenna array 15 of a network node 10 in the communication network 50, wherein the antenna array 15 has first and second dimensions. The implementation also includes a determining module for determining precoding recommendations for transmitting to the communication device 30 from the antenna array 15, based on evaluating the received transmissions, and a sending module for sending first and second precoding reports to the network node 10 by time multiplexing the first and second precoding reports onto a reporting channel in accordance with a multiplexing ratio, wherein the first and second precoding reports comprise first and second precoding recommendations respectively corresponding to the first and second dimensions of the antenna array 15.

Functional modules or circuit architecture may be implemented in a network node 10, e.g., based on the processing circuitry 16. In an example, the implementation at least functionally includes a receiving module for receiving precoding reports from a communication device 30, for use in precoding transmissions to the communication device 30 from an antenna array 15. The precoding reports include first and second precoding reports sent by the communication device 30 on a reporting channel in time-multiplexed fashion according to a multiplexing ratio, and the first and second precoding reports include first and second precoding recommendations respectively corresponding to first and second dimensions of the antenna array 15. The implementation also includes a determining module for determining whether individual ones of the precoding reports comprise one of the first precoding reports or comprise one of the second precoding reports, based on the multiplexing ratio. The implementation further includes precoding transmissions to the communication device 30 from the antenna array 15, according to precoding weights determined in consideration of the first and second precoding recommendations.

While such embodiments may be particularly advantageous, further, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method implemented by a communication device configured for operation in a communication network, the method comprising:
   receiving transmissions from an antenna array of a network node in the communication network, wherein the antenna array has first and second dimensions;
   determining precoding recommendations for transmitting to the communication device from the antenna array, based on evaluating the received transmissions, wherein the precoding recommendations comprise first recommendations pertaining to the first dimension and second recommendations pertaining to the second dimension; and
   sending, to the network node by time multiplexing onto a reporting channel, a first number of first precoding reports comprising the first recommendations and a second number of second precoding reports comprising the second recommendations, by time multiplexing in accordance with a particular multiplexing ratio relating the first number and the second number.

2. The method of claim 1, wherein a reporting cycle comprises N precoding reports sent from the communication device to the network node on the reporting channel, and wherein the particular multiplexing ratio stipulates that M first precoding reports and second precoding reports are sent in every reporting cycle, where N is an integer and M is an integer less than or equal to N.

3. The method of claim 1, wherein one of the first and second dimensions is prioritized over the other one of the first and second dimensions, and wherein the particular multiplexing ratio reflects the prioritization.

4. The method of claim 3, further comprising changing the prioritization in dependence on at least one of: control signaling incoming from the communication network; channel conditions at the communication device; and a location of the communication device.

5. The method of claim 1, further comprising setting the particular multiplexing ratio to a value determined by the communication network.

6. The method of claim 5, further comprising determining a multiplexing ratio recommendation and sending the multiplexing ratio recommendation to the communication network, for consideration by the communication network in setting the particular multiplexing ratio.

7. The method of claim 1, further comprising setting the particular multiplexing ratio to a value determined by the communication device in dependence on any one or more of:
   an application or service type associated with the communication device;
   a mobility profile of the communication device;

historical data corresponding to past usage of one or more multiplexing ratios;

historical or current communication performance of the communication device; and a current location of the communication device.

8. The method of claim 7, wherein the mobility profile comprises one or more of:

a Doppler metric or speed of the communication device;

an acceleration of the communication device;

a direction of motion of the communication device;

a change in a location of the communication device.

9. The method of claim 1, wherein one of the first and second dimensions is a horizontal dimension and the other one of the first and second dimensions is a vertical dimension and, correspondingly, the first precoding reports comprise one of horizontal precoding reports and vertical precoding reports and the second precoding reports comprise the other one of the horizontal precoding reports and the vertical precoding reports.

10. The method of claim 9, wherein each horizontal precoding report indicates a horizontal precoding matrix recommendation comprising antenna element weights corresponding to the horizontal dimension of the antenna array, and wherein each vertical precoding report indicates a vertical precoding matrix recommendation comprising antenna element weights corresponding to the vertical dimension of the antenna array.

11. A communication device configured for operation in a communication network and comprising:

a communication interface circuit configured to receive transmissions from an antenna array of a network node in the communication network, wherein the antenna array has first and second dimensions; and a processing circuit configured to:

determine precoding recommendations for transmitting to the communication device from the antenna array, based on evaluating the received transmissions, wherein the precoding recommendations comprise first recommendations pertaining to the first dimension and second recommendations pertaining to the second dimension; and send, to the network node via the communication interface circuit by time multiplexing onto a reporting channel, a first number of first precoding reports comprising the first recommendations and a second number of second precoding reports comprising the second recommendations, by time multiplexing in accordance with a particular multiplexing ratio relating the first number and the second number.

12. The communication device of claim 11, wherein a reporting cycle comprises N precoding reports sent from the communication device to the network node on the reporting channel, and wherein the particular multiplexing ratio stipulates that M first precoding reports and second precoding reports are sent in every reporting cycle, where N is an integer and M is an integer less than or equal to N.

13. The communication device of claim 11, wherein one of the first and second dimensions is prioritized over the other one of the first and second dimensions, and wherein the particular multiplexing ratio reflects the prioritization.

14. The communication device of claim 13, wherein the processing circuit is configured to change the prioritization in dependence on at least one of: control signaling incoming from the communication network; channel conditions at the communication device; and a location of the communication device.

15. The communication device of claim 11, wherein the processing circuit is configured to set the particular multiplexing ratio to a value determined by the communication network.

16. The communication device of claim 15, wherein the processing circuit is configured to determine a multiplexing ratio recommendation and send the multiplexing ratio recommendation to the communication network, for consideration by the communication network in setting the particular multiplexing ratio.

17. The communication device of claim 11, wherein the processing circuit is configured to set the particular multiplexing ratio to a value determined by the processing circuit in dependence on any one or more of:

an application or service type associated with the communication device;

a mobility profile of the communication device;

historical data corresponding to past usage of one or more multiplexing ratios;

historical or current communication performance of the communication device; and a current location of the communication device.

18. The communication device of claim 17, wherein the mobility profile comprises one or more of:

a Doppler metric or speed of the communication device;

an acceleration of the communication device;

a direction of motion of the communication device;

a change in a location of the communication device.

19. The communication device of claim 11, wherein one of the first and second dimensions is a horizontal dimension and the other one of the first and second dimensions is a vertical dimension and, correspondingly, the first precoding reports comprise one of horizontal precoding reports and vertical precoding reports and the second precoding reports comprise the other one of the horizontal precoding reports and the vertical precoding reports.

20. The communication device of claim 19, wherein each horizontal precoding report indicates a horizontal precoding matrix recommendation comprising antenna element weights corresponding to the horizontal dimension of the antenna array, and wherein each vertical precoding report indicates a vertical precoding matrix recommendation comprising antenna element weights corresponding to the vertical dimension of the antenna array.

21. A method implemented by a network node configured for operation in a communication network, the method comprising:

receiving, from a communication device via a reporting channel, precoding reports for use in precoding transmissions to the communication device from an antenna array having first and second dimensions, wherein:

the precoding reports comprise a first number of first precoding reports comprising precoding recommendations pertaining to the first dimension, and a second number of second precoding reports comprising precoding recommendations pertaining to the second dimension; and the precoding reports are time-multiplexed according to a particular multiplexing ratio relating the first number and the second number;

determining whether individual ones of the precoding reports comprise one of the first precoding reports or comprise one of the second precoding reports, based on the particular multiplexing ratio; and precoding transmissions to the communication device from the antenna array, according to precoding weights determined in consideration of the precoding recommendations comprising the determined first or second precoding reports.

22. The method of claim 21, wherein determining whether individual ones of the precoding reports comprise one of the first or second precoding reports further comprises determining whether individual ones of the precoding reports comprise one of the first or second precoding reports based on a reporting cycle over which the particular multiplexing ratio applies, wherein the reporting cycle comprises N precoding reports sent from the communication device on the reporting channel, and wherein the particular multiplexing ratio stipulates that M first precoding reports and second precoding reports are sent in every reporting cycle, where N is an integer and M is an integer less than or equal to N.

23. The method of claim 21, further comprising indicating the particular multiplexing ratio via signaling sent to the communication device.

24. The method of claim 21, further comprising receiving a multiplexing ratio recommendation from the communication device, and setting the particular multiplexing ratio in consideration of the multiplexing ratio recommendation.

25. The method of claim 21, further comprising setting the particular multiplexing ratio in dependence on a prioritization between the first and second dimensions of the antenna array.

26. The method of claim 25, further comprising determining the prioritization in dependence on at least one of: channel conditions at the communication device; and a location of the communication device.

27. The method of claim 21, further comprising setting the particular multiplexing ratio in dependence on any one or more of:
an application or service type associated with the communication device;
a mobility profile of the communication device;
historical data corresponding to past usage of one or more multiplexing ratios;
historical or current communication performance of the communication device; and
a current location of the communication device.

28. The method of claim 27, wherein the mobility profile comprises one or more of:
a Doppler metric or speed of the communication device;
an acceleration of the communication device;
a direction of motion of the communication device;
a change in a location of the communication device.

29. The method of claim 21, wherein the particular multiplexing ratio defines a pattern of first and second precoding reports within a reporting cycle, and wherein determining whether individual ones of the precoding reports comprise one of the first precoding reports or comprise one of the second precoding reports comprises receiving a given precoding report, determining a position of the given precoding report within the pattern, and determining whether the position corresponds to the first precoding reports or to the second precoding reports.

30. A network node configured for operation in a communication network and comprising:
a communication interface circuit configured to receive, from a communication device via a reporting channel, precoding reports for use in precoding transmissions to the communication device from an antenna array having first and second dimensions, wherein:
the precoding reports comprise a first number of first precoding reports comprising precoding recommendations pertaining to the first dimension, and a second number of second precoding reports comprising precoding recommendations pertaining to the second dimension; and
the precoding reports are time-multiplexed according to a particular multiplexing ratio relating the first number and the second number; and
a processing circuit configured to:
determine whether individual ones of the precoding reports comprise one of the first precoding reports or comprise one of the second precoding reports, based on the particular multiplexing ratio; and
precode transmissions to the communication device from the antenna array, according to precoding weights determined in consideration of the precoding recommendations comprising the determined first or second precoding reports.

31. The network node of claim 30, wherein the processing circuit is configured to determine whether individual ones of the precoding reports comprise one of the first or second precoding reports based on a reporting cycle over which the particular multiplexing ratio applies, wherein the reporting cycle comprises N precoding reports sent from the communication device on the reporting channel, and wherein the particular multiplexing ratio stipulates that M first precoding reports and second precoding reports are sent in every reporting cycle, where N is an integer and M is an integer less than or equal to N.

32. The network node of claim 30, wherein the processing circuit is configured to indicate the particular multiplexing ratio via signaling sent to the communication device.

33. The network node of claim 30, wherein the processing circuit is configured to receive a multiplexing ratio recommendation from the communication device, and set the particular multiplexing ratio in consideration of the multiplexing ratio recommendation.

34. The network node of claim 30, wherein the processing circuit is configured to set the particular multiplexing ratio in dependence on a prioritization between the first and second dimensions of the antenna array.

35. The network node of claim 34, wherein the processing circuit is configured to determine the prioritization in dependence on at least one of: channel conditions at the communication device; and a location of the communication device.

36. The network node of claim 30, wherein the processing circuit is configured to set the particular multiplexing ratio in dependence on any one or more of:
an application or service type associated with the communication device;
a mobility profile of the communication device;
historical data corresponding to past usage of one or more multiplexing ratios;
historical or current communication performance of the communication device; and
a current location of the communication device.

37. The network node of claim 36, wherein the mobility profile comprises one or more of:
a Doppler metric or speed of the communication device;
an acceleration of the communication device;
a direction of motion of the communication device;
a change in a location of the communication device.

38. The network node of claim 30, wherein the particular multiplexing ratio defines a pattern of first and second precoding reports within a reporting cycle, and wherein the processing circuit is configured to determine whether individual ones of the precoding reports comprise one of the first precoding reports or comprise one of the second precoding reports based on receiving a given precoding report, determining a position of the given precoding report within the pattern, and determining whether the position corresponds to the first precoding reports or to the second precoding reports.

* * * * *